June 27, 1967

Y. C. BELENTEPE ETAL 3,328,148

GLASS-FORMING METHOD

Filed June 19, 1963

INVENTORS
Yilmaz C. Belentepe, Arieh Carmi,
Harry R. Kiehl, Harris G. Rodgers

BY Clarence R. Patty, Jr.

ATTORNEY

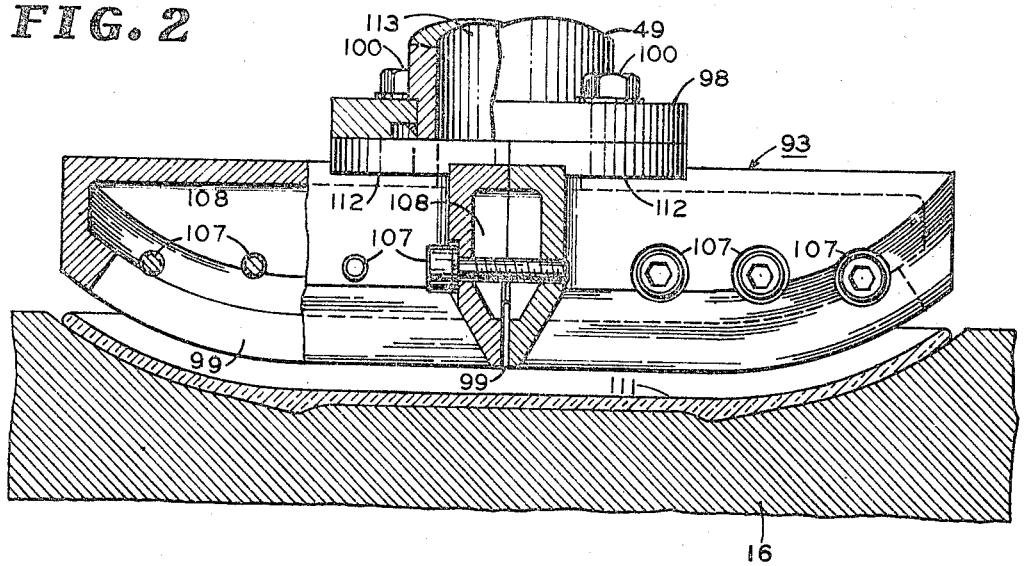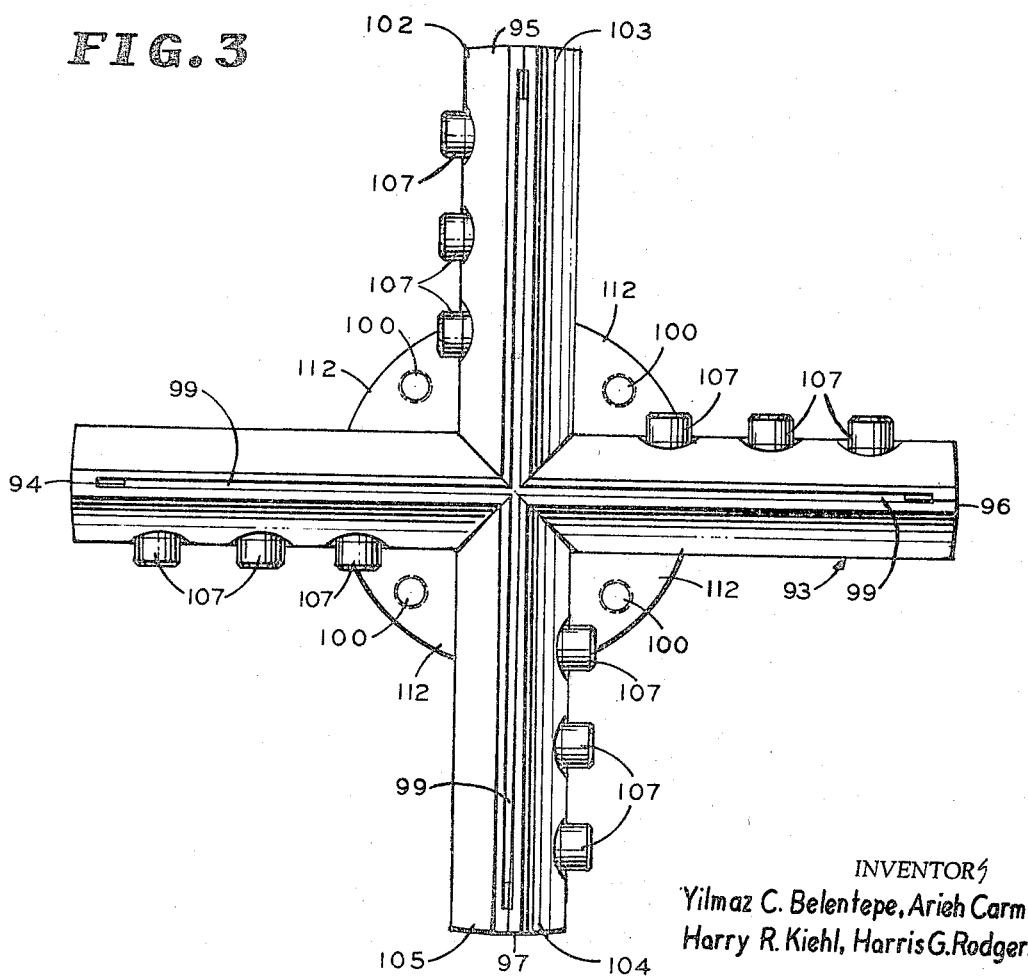

United States Patent Office 3,328,148
Patented June 27, 1967

3,328,148
GLASS-FORMING METHOD
Yilmaz C. Belentepe, Arieh Carmi, Harry R. Kiehl, and Harris G. Rodgers, Corning, N.Y., assignors to Corning Glass Works, Corning, N.Y., a corporation of New York
Filed June 19, 1963, Ser. No. 288,962
5 Claims. (Cl. 65—82)

The present invention relates to a method of and apparatus for glass forming. More particularly, the invention relates to a method of aeriform fluid pressing and cooling of newly formed glass articles. Still more specifically, the invention relates to a method of and apparatus for maintaining the configuration initially imparted to a glass article by other forming means such as, for example, a mold and cooperating plunger the glass article still being in a semi-plastic condition following the initial forming thereof.

One method of and apparatus for maintaining glass articles in their molded form, by the application thereto of air under pressure immediately following the forming of the article, is disclosed in Letters Patent of the United States 1,134,200 issued Apr. 6, 1915, to Herman A. Heupel for Process and Apparatus for Treating Pressed Glass Articles. It is also well known in the glass-making art to temper previously formed and cooled glass articles by reheating the articles to a tempertaure below the softening point thereof and then recooling certain portions of the article at different rates by selectively applying jets of air to selected areas of the surfaces of the article. Such selective cooling of the article tempers the article by causing compression in selected areas of the surfaces of the article and resultant desired stresses in the inner layer of the article at selected portions thereof. One process for tempering glass articles is disclosed, for example, in Letters Patent of the United States 2,269,060 issued Jan. 6, 1942 to John B. Mitford for Tempering of Hollow Glass Articles. However, insofar as is known, no method, such as disclosed herein, has heretofore been provided for aeriform fluid forming and simultaneously cooling glass articles, still in their semi-plastic condition after initial forming thereof, to set up the configuration initially imparted to the article by other forming means.

It is, therefore, the object of the present invention to provide a method of maintaining the configuration imparted to a glass article by one forming means, such method comprising the selective application of aeriform fluid under pressure to the article while it is still in a semi-plastic condition after the initial forming thereof.

In accomplishing the above object of the invention, a new and novel method of aeriform fluid pressing and cooling is employed, wherein one or more jets of pressurized aeriform fluid are caused to rapidly brush over an exposed surface of a newly formed glass article, each such jet being issued from an orifice at a high velocity low volume rate.

Other objects and characteristic features of our invention will become apparent later in this description.

One type of glass press in use today for the forming of glass articles, such as, for example, articles of dinnerware, includes a circular table mounted for rotation about a vertical axis and carrying a series of press molds about its periphery which are succesively indexed beneath a pressing plunger after the receipt of a mold charge provided by a suitable feeder. As will become apparent hereinafter, the present invention is illustrated and described, for purposes of example only, as embodied in such a glass-pressing apparatus.

The invention disclosed herein is found to be especially adaptable for use in conjunction with compositions employed in the manufacture of glass-ceramic or semicrystalline ceramic bodies, such as articles of dinnerware, such compositions being a relatively recent development in the glass art. Several such compositions are disclosed, for example, in copending application Ser. No. 211,794 filed July 23, 1962 by John F. MacDowell for Glass Ceramic Bodies and Method of Making Them, such application being assigned to the same assignee as the present application. As set forth in such co-pending application, a selected glass-forming composition is melted at a temperature of about 1600° C. and, following the prescribed period of melting time, is supplied to molds to be pressed into the desired form. The viscosity of such a molten glass is, due to its composition, relatively low, that is, in the vicinity of 500 poises, and it is possible, therefore, to charge the molds of the type of glass press previously mentioned at a relatively high rate of speed. In order, therefore, to operate such glass-pressing apparatus at as high a rate of speed as practicable and to obtain the economic advantages resulting from such speed of operation, it is desirable that the forming plunger be withdrawn from the pressed glass article at the earliest possible time following the pressing of the glass. Also the withdrawal of the plunger from the glass while the pressed article is still in a semi-plastic condition substantially reduces the tendency of such article to bind to the plunger. However, in the withdrawal of the plunger from the glass at the earliest practical time following the forming of a glass article, it has been found that the pressed article while still in its semi-plastic condition does not bind to the plunger but does tend to warp or lose the form into which it has been pressed; that is, subsequent to the removal of the forming plunger, flat ware articles curl upwards about their centers and form what are commonly termed "spinners," while the walls of hollow ware distort inwardly. Accordingly, the present invention may be employed, in the manufacture of such articles, to maintain the configuration initially formed in the articles by a mold and plunger apparatus.

One form of apparatus that may be employed in practicing the inventive method disclosed herein will now be described.

In the accompanying drawings:

FIG. 2 is a side elevational view, partly cross-sectional, showing the structure of the head of one type of aeriform fluid pressing device or former that may be used in conjunction with the apparatus of FIG. 1.

FIG. 3 is a bottom elevational view of the structure of the aeriform fluid pressing head or former shown in FIG. 2.

Similar reference characters refer to similar parts in each of the drawings.

Figure 1:
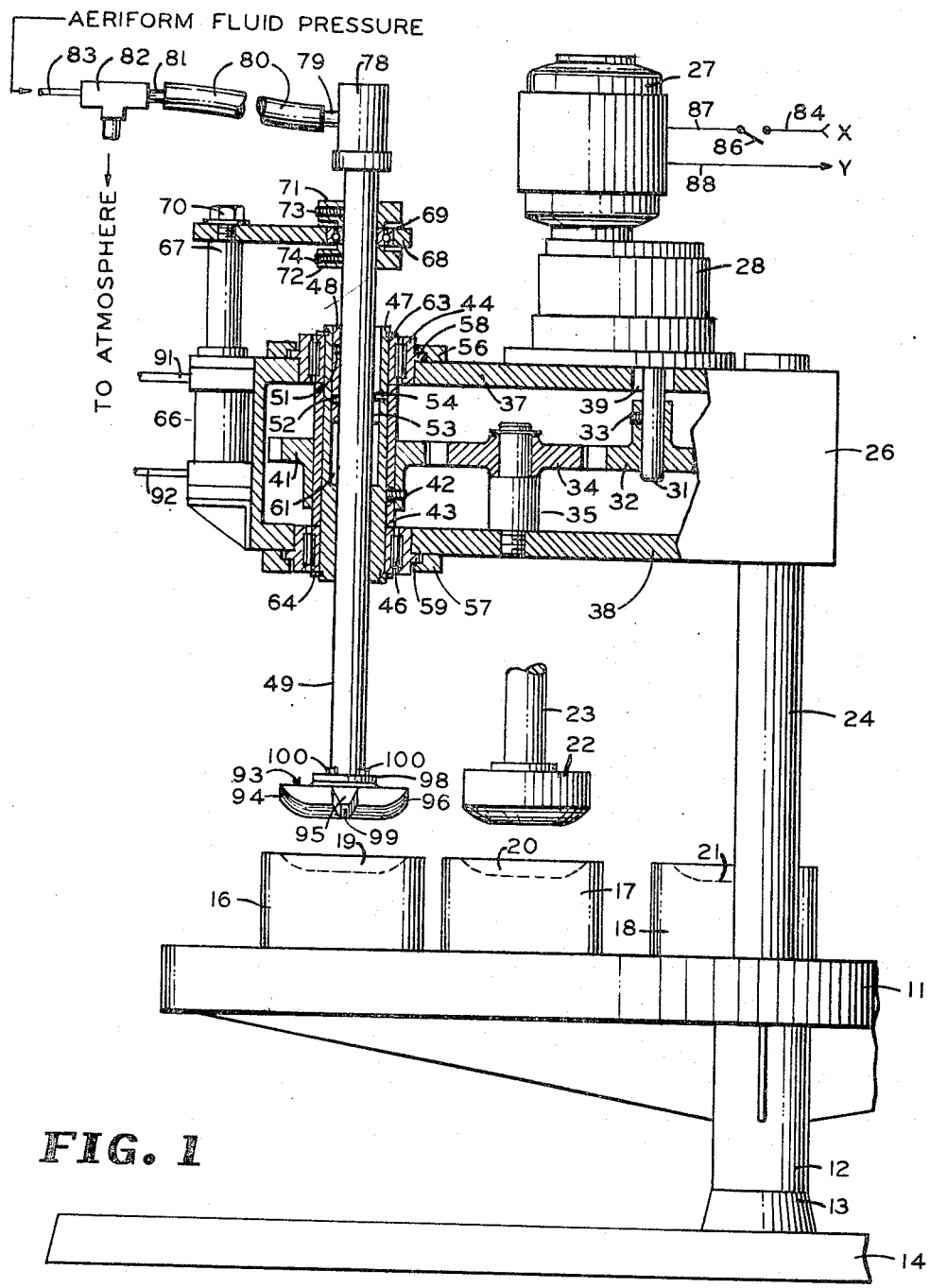
FIG. 1 is a side elevational view showing a part of the table of a glass press with several of the usual molds thereon, and including a sectional view of one type of apparatus for practicing the invention and intended to be used in conjunction with a glass press.

Referring to FIG. 1 of the drawings, the structure illustrated comprises a rotatable table 11 which is supported by a pedestal 12, both of which are mounted for rotation on a bearing block 13 which is in turn supported on a base 14. Around the periphery of table 11 is provided a plurality of press molds such as 16, 17 and 18 provided with cavities 19, 20, and 21, respectively, in which gobs of molten glass or mold charges are provided to be pressed as the table 11 is periodically rotated in a counterclockwise direction, as viewed from above, and each mold is thereby successively indexed to a position directly under a pressing plunger 22 which is actuated in the well-known manner, by a ram rod 23, from its raised position shown in the drawing to a glass pressing position. As viewed in the drawing, molds are shown only on the left and to the rear of the periphery of table 11, the molds ordinarily provided at the other indexing positions, that is, on the front of the table periphery, being omitted for purposes of clarity of the drawing.

A gear casing or box 26 is securely attached to supporting post 24 which extends through table 11 and pedestal 12, and is immovably affixed to bearing block 13. For simplification, the details of this arrangement are not shown in the drawing but it will be readily understood that table 11 and pedestal 12 are free to be rotated on bearing block 13 and about post 24. The side of gear box 26 is shown broken away to show an internal cross-sectional view of the box which includes relatively sturdy top and bottom plates 37 and 38, respectively, which also act as supports or supporting arms as hereinafter discussed.

There is securely affixed to the top of plate 37 a motor assembly shown as comprising an electric motor 27 and an associated speed reduction gear transmission 28, the housing only of which is, for purposes of simplicity, shown in the drawing. A rotating shaft 31, driven by motor 27 through transmission 28, is shown extending downward from the transmission through an opening 39 provided in plate 37. A gear train comprising spur gears 32, 34, and 41 is provided within gear box 26, and gear 32 is securely connected to shaft 31 by means of a set screw 33. Gear 32 drives gear 34 which is an idler gear mounted for rotation on the spindle portion of an axle 35 screwed into bottom plate 38 of box 26. Gear 34 in turn drives gear 41 which is securely connected by a set screw 42 to a spacing sleeve 43 surrounding a second sleeve 47. Set screw 42 extends through sleeve 43 to bear securely against sleeve 47, whereby sleeves 43 and 47 are both rotated by the rotation of gear 41. Sleeve 43, at its upper and lower ends respectively, bears on the edges of the inner races of roller bearings 44 and 46, and rotates in conjunction with such races. Sleeve 47, at its upper and lower ends respectively, extends through the usual opening provided in each of the inner races of roller bearings 44 and 46, and also rotates in conjunction with such races. The position of sleeve 47 within the inner races of bearings 44 and 46 is maintained both by set screw 42 and by split tension rings 63 and 64 inserted in grooves provided around the outside circumference of sleeve 47 adjacent the upper and the lower ends thereof, respectively.

The outer races of bearings 44 and 46 are provided with flanges 58 and 59, respectively, each extending around the outside circumference of its respective race. Bearing 44 is located and secured within a closely fitting hole, provided in top plate 37 of gear box 26, by a ring 56 securely affixed to plate 37 and surrounding said bearing, such ring being provided with an inwardly extending flange which overlaps and tightly presses flange 58 of the outer race of bearing 44 downward against plate 37. Similarly, bearing 46 is located and secured within a closely fitting hole, provided in lower plate 38 of box 26, by a ring 57 affixed to plate 38, such ring having an inwardly extending flange which overlaps and tightly presses flange 59 of the outer race of bearing 46 upward against plate 38.

The circular opening extending throughout the length of sleeve 47 is shown, at its lower end and throughout approximately two fifths of its entire length, to be of such a diameter as to fit snugly around a hollow shank or shaft 49 inserted lengthwise through the opening in the sleeve and extending for a considerable distance above and below the top and bottom ends, respectively, of the sleeve. The upper end of the longitudinal circular opening through sleeve 47, that is, approximately the upper three fifths the length of the sleeve, is shown as having a diameter considerably larger that the lower part of the sleeve. A third sleeve 48 is snugly fitted into the enlarged opening so provided towards the upper end of sleeve 47, and the circular opening, extending throughout the length of this third sleeve, is of a diameter identical to that provided throughout the length of the lower two-fifths of sleeve 47.

As previously stated shank or shaft 49 fits snugly within the opening in the lower part of sleeve 47 but it is to be understood that the shaft may move freely longitudinally and freely rotate in said opening. Similarly, sleeve 48 fits snugly in the opening in the upper part of sleeve 47, but it is to be understood that sleeve 48 may freely move longitudinally in said opening.

Sleeve 48 is shown as a split sleeve, that is, does not comprise a complete cylinder, but is provided with a slot 53 which extends the full length of the sleeve. Alternately, sleeve 48 could be provided with a groove extending partly through the side wall of the sleeve rather than the slot extending completely through such side wall. A pin or key 54 is inserted into a hole in the sidewall or sleeve 47 and extends into slot 53 to key sleeves 47 and 48 together. By this arrangement, it will be readily apparent, that sleeve 48 may move longitudinally, that is, as shown in the drawing, vertically within sleeve 47. Sleeve 48 is somewhat shorter than the length of the enlarged opening in sleeve 47 and, therefore, when sleeve 48 is moved in a downward direction from its position shown in the drawing, the lower part of sleeve 48 slides into the cylindrical open portion 61 provided in sleeve 47, the pin or key 54 preventing the rotation of sleeve 47 around the outside surface of sleeve 48.

Two set screws 51 and 52 are screwed through threaded holes in sleeve 48 and immovably secure the sleeve to shaft 49. Holes or a slot can be provided in the side wall of shaft 49 to receive the ends of said set screws if it is considered necessary for immovably connecting the two pieces, 48 and 49.

By the arrangement above described it will be apparent that gear 41, sleeves 43, 47 and 48, and shaft 49 will all rotate in unison when gear 41 is rotated by gear 34. At the same time, sleeve 48 and shaft 49 are free to move in a vertical direction within sleeve 47, at which time, key 54 slides in slot 53 provided in the sidewall of sleeve 48.

There is affixed to the end of gear box 26 a cylinder 66 housing a piston (not shown). However, a piston rod 67 is shown extending from the upper end of cylinder 66 and it will be readily understood by those skilled in the art that piston rod 67 is actuated to its upper position shown in the drawing or to its lower position, accordingly as fluid pressure is supplied to cylinder 66 through conduits 92 or 91, respectively, connecting to the lower and upper ends, respectively, of cylinder 66.

One end of an arm 68 is securely fastened to the end of piston rod 67 as by a bolt 70, the outer end of the arm being securely affixed to the outer race of a ball bearing 69. The upper end of shaft 49 extends through the opening in the inner race of bearing 69, and first and second collars 71 and 72 are provided on shaft 49 above and below, respectively, bearing 69. Set screws 73 and 74 tightly connect collars 71 and 72, respectively, to shaft 49, and the lower and upper faces, respectively, of collars 71 and 72 are beveled so that such collars ride on the upper and lower edges, respectively, of the inner race of bearing 69. By the arrangement just described it will be understood that shaft 49 and collars 71 and 72 rotate on the inner race of bearing 69, while the shaft and collars may be raised or lowered by the vertical actuation of arm 68 by piston rod 67.

There is provided on the extreme upper end of shaft 49 a substantially airtight rotary union 78 through which aeriform fluid under pressure may be supplied to the hollow portion of shaft 49 while such shaft is rotated as hereinafter described, such hollow portion extending internally throughout the length of the shaft. Rotary unions such as unions 78 are well known and the union is provided with inflexible conduit or pipe 79 which is connected to one end of a flexible fluid pressure hose or conduit 80. The other end of hose 80 connects by means of an inflexible pipe 81 to one outlet end of a two-position fluid pressure valve 82. The inlet end of said valve is connected by means of a conduit 83 to a source of aeriform fluid under pressure, such source, for purposes of simplification of the drawing, not being shown therein. Such two-position valves are well known and, when the valve occupies its first position, it is closed and no pressurized fluid flows from said source. When the valve occupies its second position, pressurized fluid flows into pipe 81, hose 80 and thence to the hollow portion of shaft 49. When the valve is returned to its first position, the source of fluid pressure is again cut off. The operation of valve 82 will be further discussed hereinafter.

The lower end of shaft 49 has securely attached thereto, by means of a hollow flange 98, a hollow head or former 93 comprising a plurality of hollow arms such as 94, 95 and 96 extending radially from the center part of the former and shaft. Each arm is provided with a relatively narrow slot, such as slot 99 shown in the end of arm 95, through which aeriform fluid under pressure, supplied to shaft 49 through union 78, is emitted. It will be apparent that former 93, including its radially extending arms, is rotated in unison with rotation of shaft 49. The structure of former 93 will be discussed in detail hereinafter in reference to FIGS. 2 and 3 of the drawings.

Motor 27 is energized over an electrical circuit extending from terminal X of a suitable source of control current over an electrical conductor 84, through a manually operated switch 86 to a conductor 87, and thence through the winding of the motor to a conductor 88 and terminal Y of said current source. Switch 86 may be any of the well-known types of manually operated switches, such as a knife switch etc., which remains in the position to which it is last actuated, such switch being manually actuated to its closed position at the beginning of a series of operations of the apparatus, and being allowed to remain in such position until the series of operations is completed. It is thus apparent that motor 27 can be considered as running continuously insofar as the present invention is concerned.

Referring to FIGS. 2 and 3 of the drawings, it will be seen that the head of the type of aeriform fluid forming device chosen for purposes of discussion of the method of the invention, that it, the former 93, comprises four identical L shaped sections 102, 103, 104, and 105 which are connected together by means of a plurality of bolts 107 to form the hollow radial arms 94, 95, 96 and 97 of the former, the hollow portions of the arms 94 and 95 of the former being indicated by the reference character 108 in FIG. 2 of the drawings.

When the L shaped pieces 102 through 104 are joined together to form arms 94 through 97 as discussed above, a relatively narrow slot 99 is formed in each arm and extends from the internal hollow portion of the respective arm to the outer bottom surface of such arm. The width of slots 99 is, for purposes of convenient illustration thereof, exaggerated in FIG. 3 of the drawings, each such slot being, for example, substantially 0.010 to 0.060 inch in width. However, each slot may, of course, vary somewhat from such dimension and may also vary along its length in a predetermined manner as considered necessary. For example, the width of the slot at the outer end of each arm may be made considerably greater than the width of the slot near the center of rotation of the former. Such variations in the size of the slot will depend on the selected areas of the exposed surface of a pressed glass article to which it is predetermined that aeriform fluid must be preferentially applied in order to prevent warping of the article. Also instead of a single slot a series of short staggered slots may be selectively employed.

Referring specifically to the cutaway portion of arm 94 shown in FIG. 2 of the drawings, it will be seen that slot 99 in such arm is shown as extending substantially the radial length of the arm but its outer end is limited by the diameter of the pressed dish-like article III cross-sectionally illustrated in the cross-sectional view of its forming mold 16, such mold corresponding to mold 16 shown in FIG. 1. That is, the radial length of slot 99 in arm 94 is such that when the bottom of former 93 is located within the concave portion of article or dish 111, so that it is within a predetermined distance from the interior bottom surface of the dish as illustrated in FIG. 2, aeriform fluid under pressure may be supplied to the hollow portion 108 of arm 94 in such a manner that such fluid will be emitted through slot 99 to impinge upon dish 111 so that such impingement is always within the confines of the outer perimeter or lip of the dish whereby the pressurized fluid will not intrude between the dish and the mold 16. Such intrusion would tend to cause an article, still in a semiplastic condition following the press-forming thereof, to be blown away from its mold and defeat the purpose of the invention. The outer ends of slots 99 provided in each of the other radial arms of former 93 is, of course, determined by the same consideration.

The bottoms of each of the radial arms 94 through 97 are shown as so contoured that the bottom of the complete former 93 has, as illustrated in FIG. 2, a radially symmertical circular convex surface substantially corresponding to the radially symmetrical circular concave or interior surface of article or dish 111. Former 93 can, therefore, be rotated, as hereinafter discussed, while its bottom surface is within the concave portion of a formed glass article, such as dish 111 shown in FIG. 2

At the corner of each of the L shaped pieces which are joined by bolts 107 to form the radial arms of the former 93, there is provided a quarter circular piece 112 integrant with its respective L shaped piece. When the former 93 is joined together as shown in FIG. 2 each of the quarter-circular pieces 112 abut the similar adjoining pieces to form a complete circular piece or flange corresponding with flange 98 securely affixed to the bottom of hollow shaft 49. Both flange 98 and the flange formed by the abutting of pieces 112 are provided with an opening extending downward through the center thereof, such opening being illustrated in FIG. 2 by the dotted lines representing an extension of the hollow portion 113 of shaft 49. Flange 98 is joined, as by bolts 100, to the flange formed by circular pieces 112 and it will be understood that a hermetic or airtight aeriform fluid passage is thereby provided which continuously extends from the hollow portion 113 of shaft 49, through the flanges and into the hollow interiors 108 of the arms of former 93. Aeriform fluid supplied to such passage will, of course, flow through slots 99 and be emitted from the bottom of former 93. It is believed that the structure of the head of the forming device illustrated, that is former 93, will be readily understood by the above discussion and a brief examination of FIGS. 2 and 3 of the drawings.

It is desired to point out at this point in the description that former 93 can be provided with a greater or lesser number of radial arms than four, such apparatus being illustrated as comprising four arms merely for purposes of one example of the structure of such former, and also that holes instead of slots can be used in the formers.

Referring now to FIG. 1 of the drawings a brief description of the operation of the apparatus will be given.

As previously mentioned, at the start of a series of pressing operations, manually operated switch 86 is actuated to a closed position to complete the circuit for supplying current to motor 27 from terminals X and Y of the aforementioned current source. Motor 27 thus begins to rotate thereby driving, through speed reduction gear transmission 28 and the gear train including gears 32, 34 and 41, the sleeves 47, 48, and the aeriform fluid pressing device including shaft 49 and its head or former 93. Shaft 49 and former 93 are thereby driven at a relatively high rate of speed, as for example, 200 revolutions per minute. As also previously mentioned, switch 86 remains closed and the aeriform fluid pressing device continuously rotates at said speed during the entire series of pressing operations.

While table 11 is periodically rotated counterclockwise (as viewed from above) each of its molds is successively indexed beneath pressing plunger 22 and the plunger sequentially descends and ascends to consecutively press within each mold the charge of glass previously supplied thereto. Such operation of the glass pressing apparatus and its indexing system is old and well known.

As each mold moves from its glass pressing position beneath plunger 22, it moves into a similar position beneath former 93 while the next mold containing a glass charge is indexed beneath the plunger. Simultaneously with the descent of plunger 22 to its glass pressing position, aeriform fluid under pressure is supplied to conduit 91 connected to the top of cylinder 66, and rotating shaft 49 and former 93 are actuated by the downward movement of piston rod 67 and arm 68 to the position shown in FIG. 2 of the drawings, that is to a position so that the bottom surface of the former 93 is in relatively close proximity to the concave surface of the previously pressed glass article or dish 111 in the mold. Also simultaneously with the descent of plunger 22, valve 82 is actuated to supply pressurized aeriform fluid to shaft 49 and former 93, and, by the time former 93 has reached the end of its full downward movement, the aeriform fluid in former 93 has built up sufficient pressure that it is emitted at a high velocity from slots 99.

The admission of the aeriform fluid under pressure to conduit 91 and the actuation of valve 82 to supply such fluid to shaft 49 and former 93 may be controlled by the same sequencing or timing system that controls the descent of plunger 22, such arrangement being readily apparent to those skilled in the art. (Similarly, the admission of fluid pressure to conduit 92 to control the actuation of the former to its raised position shown in FIG. 1, as discussed below, may be controlled by the same sequencing or timing system that controls the ascent of plunger 22 following each of its glass pressing operations.)

The pressurized aeriform fluid issuing from slots 99 flows through such slots, as mentioned above, and presses dish 111 downward, thereby firmly maintaining the bottom surface of the dish against the dish forming surface of the mold while simultaneously cooling the exposed surface of the dish to set up the pressed-in form imparted to the dish by plunger 22. The spent aeriform fluid is diffused from the surface of the dish at a low velocity, being readily permitted to flow away from such surface upwardly between the large spaces provided between the radial arms of former 93. The relatively high rotary speed of the former causes the aeriform fluid of air, flowing from the holes or slots in the former and impinging upon the exposed surface of dish 111, to press the entire dish downward without causing indentations upon such surface and to cool the upper surface of the dish at the proper rate to prevent curling upward.

Following the pressing by plunger 22 of the glass charge in mold 17, for example, plunger 22 is actuated to its raised position. Simultaneously with the initiation of the movement of plunger 22 to its raised position, valve 82 is actuated to shut off aeriform fluid pressure flowing to shaft 49 and former 93. At the same time, aeriform fluid pressure is supplied to conduit 92 (FIG. 1) connected to the bottom of cylinder 66 and the movement of piston rod 67, arm 68, shaft 49 and former 93 to their raised position shown in FIG. 1 is also initiated. Former 93 and its associated apparatus subsequently completes its movement to its fully raised position shown in FIG. 1, and the entire apparatus including plunger 22 is prepared for the next successive indexing of the molds in the series of glass-forming operations.

It is to be understood that a former may be and frequently must be provided at each of a plurality of indexing stations following the pressing station and, if a pressed glass article has not sufficiently obtained the proper temperature balance and lost its plasticity after being subjected to a forming treatment by the former located at the first station following the pressing station and at the time the plunger is withdrawn from the glass charge then being pressed, the treated article may be subjected to a further forming treatment at each of the plurality of indexing stations at which a former is provided. Since the additional formers which may be provided would be repetitive, that is, each would be identical, except perhaps for the size or location of the slots or holes therein, to the former immediately following the pressing station, that is, the former shown in FIG. 1, only the former so following such station is shown in the drawings. One or more of the additional formers which may be provided can be driven by spur gear 32 through additional sets of cooperating gears similar to gears 34 and 41, one such set of gears being provided for each additional former.

As previously mentioned, by using an air former having a plurality of radial arms similar to that shown herein, it will be readily apparent that the spent pressurized aeriform fluid, impinging upon the surface of a semi-plastic form glass article, can be readily diffused or dissipated, through the spaces provided between the radial arms, away from such surface and, therefore, such spent fluid will not flow at a high velocity over the outer perimeter or edge of said article and create a negative pressure or vacuum to raise such edge in an upward direction. However, the pressurized aeriform fluid may be applied to the surface of a newly formed glass article by rapidly moving one or more thin blades or aeriform fluid in an oscillatory manner over the surface of the article, each such blade being emitted at a high velocity from an elongated jet slot. That is, a rotary motion of an aeriform fluid forming device is not necessarily required, but forming devices, incorporating other types of rapid movement to impart a brushing impingement of the aeriform fluid on the desired surface, may be employed to practice the method disclosed herein.

Several variable conditions exist relative to the herein described method of aeriform fluid forming and cooling of glass articles, such conditions being the viscosity of the formed glass article at the time it is being so treated, the period of time available for such treatment, the period of cooling necessary to cause the formed glass article to properly become "set up" in a firm condition and the relative temperatures of the exposed side of the article and the side in contact with the mold. These conditions vary in accordance with the composition of the glass being used to form the glass article, the shape of the article, the temperature distribution in the mold and the period of time employed in initially imparting such shape to the article. Accordingly, the number and dimensions of the orifices employed for issuing the jets of aeriform fluid pressure, the distance of such orifices from the surface to be treated, the speed of movement of said jets over said surface, and the pressure behind said jets are all factors which must be chosen with consideration to the conditions previously mentioned. It will be apparent, however, that the chosen factors may, under some conditions, be varied in combinations to produce the identical desired result. For example, the spacing of the orifices from the glass surface to be treated may be increased or decreased, in some instances, if the velocity of the fluid issuing from the orifices is increased or decreased, respectively, to compensate for the changed spacing. Such velocity may possibly be varied, in some cases, by either varying the pressure of the source of aeriform fluid or by varying the dimensions of the orifices through which such fluid is emitted. The one main factor that must always be considered in practicing the method disclosed herein is to assure that a low velocity path for escape of the spent aeriform fluid away from the surface of the article being treated is provided.

Although there is herein shown and described only a single form of apparatus employing the inventive method disclosed, it is to be understood that other forms of apparatus may be employed for the practice of the invention and the protection sought for the invention is intended to be limited only within the scope and spirit of the appended clams.

What is claimed is:

1. The method of maintaining the configuration of a thermo-plastic article formed by a mold and cooperating overlying plunger and still in a semi-plastic condition following the separation of the plunger from the article and its mold, which comprises, rapidly brushing selected areas of the exposed surface of the article with a jet of aeriform fluid sufficient to maintain the unexposed surface of the article against the mold and simultaneously cool said selected areas at a rate sufficient to prevent distortion on cooling due to differences in temperature of the two surfaces, while releasing the spent aeriform fluid from the exposed surface of the article at a low velocity.

2. The method of maintaining the configuration of a thermo-plastic article still in a semi-plastic condition in its forming mold, which comprises, exposing one surface of the article, and rapidly brushing the exposed surface of the article at least once with a low volume high velocity jet of aeriform fluid to maintain the unexposed surface of the article against its mold and simultaneously cool the exposed surface of the article while releasing the spent aeriform fluid from said exposed surface at a low velocity.

3. The method of maintaining the configuration of a thermo-plastic article formed by a mold and cooperating overlying plunger and still in a semi-plastic condition, which comprises, separating the plunger from the article and its mold, and rapidly and repeatedly sweeping the exposed surface of the article with at least one blade of high velocity aeriform fluid to maintain the unexposed surface of the article against the mold and simultaneously cool the exposed surface of the article at a rate sufficient to prevent distortion by differential cooling of both surfaces, while permitting the spent aeriform fluid to escape from the surface of the article at a low velocity.

4. The method of maintaining the configuration initially imparted to a glass article having an exposed surface and being still in a semi-plastic condition following the forming thereof, which comprises, impinging said exposed surface with a rapidly moving thin blade of aeriform fluid issuing from an elongated jet orifice normal to such surface, the spacing of said orifice from said surface and the velocity of said fluid being so selected as to firmly press against the surface without indentation thereof while simultaneously cooling the surface at a rate sufficient to prevent distortion, and permitting the spent aeriform fluid to diffuse away from the surface at a low velocity.

5. The method of maintaining the form of a pressed glass article formed by a mold and plunger and still in a semi-plastic condition following removal of the pressing plunger from the article, which comprises, aeriform fluid pressing the article against its mold and simultaneously aeriform fluid cooling selected areas of the exposed surface of the article at a rate approximately equal to the cooling rate of the corresponding areas of the mold-contacting surface of the article.

References Cited

UNITED STATES PATENTS

| | | | |
|---|---|---|---|
| 687,595 | 11/1901 | Blue | 65—229 |
| 1,134,200 | 4/1915 | Heupel | 65—68 |
| 1,854,471 | 4/1932 | Hofmann | 65—348 |
| 2,254,227 | 9/1941 | Lewis | 65—115 |
| 2,269,060 | 1/1942 | Mitford | 65—115 |
| 2,284,796 | 6/1942 | Berthold | 65—306 X |
| 2,302,078 | 11/1942 | Wadman | 65—348 |
| 2,347,116 | 4/1944 | Littleton et al. | 65—348 |
| 2,470,245 | 5/1949 | Green | 65—115 |
| 2,563,130 | 8/1951 | Mylchreest | 65—348 |
| 2,677,919 | 5/1954 | Worrest | 65—348 |
| 2,833,088 | 5/1958 | Olson et al. | 65—348 |
| 2,895,260 | 7/1959 | Jellyman et al. | 65—115 |
| 3,125,429 | 3/1964 | Lauck et al. | 65—84 |

DONALL H. SYLVESTER, *Primary Examiner.*

F. W. MIGA, *Assistant Examiner.*